United States Patent
Carney et al.

(10) Patent No.: US 9,481,150 B2
(45) Date of Patent: *Nov. 1, 2016

(54) MULTILAYER FILM

(71) Applicant: E I DU PONT DE NEMOURS AND COMPANY, Wilmington, DE (US)

(72) Inventors: Thomas Edward Carney, Orient, OH (US); Christopher Robert Becks, Grove City, OH (US); Jeffrey Michael Bartolin, Westerville, OH (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,879

(22) Filed: Dec. 10, 2014

(65) Prior Publication Data

US 2016/0167346 A1    Jun. 16, 2016

(51) Int. Cl.
| C09D 179/08 | (2006.01) |
| B05D 7/00 | (2006.01) |
| B32B 27/08 | (2006.01) |
| B32B 27/28 | (2006.01) |
| B32B 27/20 | (2006.01) |

(52) U.S. Cl.
CPC ............... *B32B 27/08* (2013.01); *B32B 27/20* (2013.01); *B32B 27/281* (2013.01); *B32B 2250/24* (2013.01); *B32B 2264/10* (2013.01); *B32B 2264/102* (2013.01); *B32B 2305/30* (2013.01); *B32B 2307/204* (2013.01); *B32B 2307/408* (2013.01); *B32B 2457/00* (2013.01)

(58) Field of Classification Search
None
See application file for complete search history.

(56) References Cited

U.S. PATENT DOCUMENTS

| 7,018,704 | B2 | 3/2006 | Kaneshiro et al. | |
| 8,124,223 | B2 | 2/2012 | Kanakarajan et al. | |
| 2007/0009751 | A1 | 1/2007 | Hwang et al. | |
| 2007/0166535 | A1 | 7/2007 | Lu et al. | |
| 2011/0039085 | A1* | 2/2011 | Carney ............... | C08J 5/18 428/220 |
| 2012/0141758 | A1* | 6/2012 | Boussaad ............. | C08J 5/18 428/220 |
| 2012/0141759 | A1* | 6/2012 | Boussaad ............. | C08L 79/08 428/220 |
| 2012/0142825 | A1* | 6/2012 | Boussaad ............. | C08L 79/08 524/39 |
| 2012/0142826 | A1* | 6/2012 | Boussaad ............. | C08J 5/18 524/40 |
| 2013/0011645 | A1 | 1/2013 | Carney et al. | |
| 2013/0029166 | A1* | 1/2013 | Carney ............... | C08J 5/18 428/473.5 |
| 2013/0065033 | A1 | 3/2013 | Wu et al. | |
| 2014/0220335 | A1 | 8/2014 | Lin et al. | |

(Continued)

FOREIGN PATENT DOCUMENTS

| EP | 0659553 A1 | 6/1995 |
| WO | 2010/101822 A1 | 9/2010 |
| WO | 2011/017291 A1 | 2/2011 |
| WO | WO2012011970 A * | 1/2012 |

OTHER PUBLICATIONS

Research Disclosure RD405061A, dated Jan. 10, 1998.

(Continued)

*Primary Examiner* — Tahseen N Khan

(57) ABSTRACT

The present disclosure is directed to multilayer film having has an L* color less than 30 and a 60 degree gloss value less than 10. The multilayer film has a first polyimide layer and a second polyimide layer. The second polyimide layer has 25 to 50 wt % of a polyimide, 15 to 35 wt % of a polyimide particle matting agent, greater than 0 and less than 20 wt % of at least one submicron carbon black and 15 to 50 wt % of at least one submicron fumed metal oxide.

24 Claims, 1 Drawing Sheet

(56) References Cited

U.S. PATENT DOCUMENTS

2015/0166832 A1* 6/2015 Carney ............... B32B 7/00 428/215
2015/0166833 A1* 6/2015 Carney ............. B32B 27/281 428/215

OTHER PUBLICATIONS

International Search Report and Written Opinion Dated Mar. 2, 2015 for International Application No. PCT/US2014/069511.

* cited by examiner

MULTILAYER FILM

FIELD OF DISCLOSURE

This disclosure relates generally to a multilayer film. More specifically, the multilayer film has a first polyimide layer and a second polyimide layer containing a matting agent, submicron carbon black and submicron fumed metal oxide.

BACKGROUND OF THE DISCLOSURE

Industry increasingly desires polyimide films for electronic application to be matte in appearance, have a specific color, durability to handling and circuit processing, and when used as a coverlay, provide security against unwanted visual inspection of the electronic components protected by the coverlay. Single layer matte luster films do not have an L* color less than 30 providing deep, rich saturated colors desired by industry. Typically, as the amount of matting agent is increased the color of the film becomes muted. The effect of increased surface roughness from the matting agent is the dilution of the pigment color so that it appears lighter and less saturated. This is caused by the dilution of the diffuse reflectance (where pigment color is perceived) by the increased scatter of the specular reflectance (white light). The rougher the surface, the lower the gloss and greater the scatter of the specular reflectance. Thus, as gloss decreases, L* (lightness) typically increases. Adding more colorant does not decrease the L* color. Thus, simultaneously achieving low gloss and low L* color is therefore difficult.

For the forgoing reasons, a need exists for a polyimide film that is matte in appearance, has deep, rich saturated colors, as well as provide sufficient optical density to provide visual security when used as a coverlay while having acceptable electrical properties (e.g., dielectric strength) mechanical properties, and durability to handling and circuit processing.

SUMMARY

The present disclosure is directed to a multilayer film comprising:
 a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
 b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and
wherein the multilayer film has an L* color less than 30 and a 60 degree gloss value less than 10.

DETAILED DESCRIPTION

Figure 1:
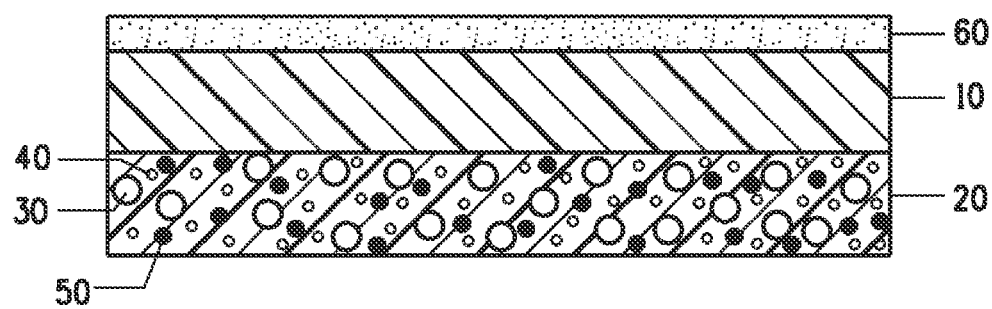
FIG. 1 illustrates an adhesive layer in direct contact with the first polyimide layer opposite from the second polyimide layer according to one embodiment of the present disclosure.

The present disclosure is directed to multilayer films that achieve a desired L* color of less than 30 and a 60 degree gloss of less than 10 while maintaining acceptable electrical properties, mechanical properties, and durability to handling and circuit processing. The multilayer film comprises a first polyimide layer and a second polyimide layer.

The use of the "a" or "an" are employed to describe elements and components of the invention. This is done merely for convenience and to give a general sense of the invention. This description should be read to include one or at least one and the singular also includes the plural unless it is obvious that it is meant otherwise.

The term "polyamic acid" as used herein is intended to include any polyimide precursor material derived from a combination of dianhydride and diamine and capable of conversion to a polyimide.

First Polyimide Layer

The first polyimide layer is derived from at least 50 mole percent of an aromatic dianhydride, based upon a total dianhydride content of the polyimide, and at least 50 mole percent of an aromatic diamine based upon a total diamine content of the polyimide. The term "dianhydride" as used herein is intended to include precursors, derivatives or analogs thereof, which may not technically be a dianhydride but would nevertheless react with a diamine to form a polyamic acid which could in turn be converted into a polyimide. The term "diamine" as used herein is intended to include precursors, derivatives or analogs thereof, which may not technically be a diamine but would nevertheless react with a dianhydride to form a polyamic acid which could in turn be converted into a polyimide.

In one embodiment, the aromatic dianhydride is selected from the group consisting of:
 pyromellitic dianhydride;
 3,3',4,4'-biphenyl tetracarboxylic dianhydride;
 3,3',4,4'-benzophenone tetracarboxylic dianhydride;
 4,4'-oxydiphthalic anhydride;
 3,3',4,4'-diphenyl sulfone tetracarboxylic dianhydride;
 2,2-bis(3,4-dicarboxyphenyl) hexafluoropropane;
 Bisphenol A dianhydride; and
 mixtures and derivatives thereof.
In another embodiment, the aromatic dianhydride is selected from the group consisting of:
 2,3,6,7-naphthalene tetracarboxylic dianhydride;
 1,2,5,6-naphthalene tetracarboxylic dianhydride;
 2,2',3,3'-biphenyl tetracarboxylic dianhydride;
 2,2-bis(3,4-dicarboxyphenyl) propane dianhydride;
 bis(3,4-dicarboxyphenyl) sulfone dianhydride;
 3,4,9,10-perylene tetracarboxylic dianhydride;
 1,1-bis(2,3-dicarboxyphenyl) ethane dianhydride;
 1,1-bis(3,4-dicarboxyphenyl) ethane dianhydride;
 bis(2,3-dicarboxyphenyl) methane dianhydride;
 bis(3,4-dicarboxyphenyl) methane dianhydride;

oxydiphthalic dianhydride;
bis(3,4-dicarboxyphenyl) sulfone dianhydride;
mixtures and derivatives thereof.

In some embodiments, examples of suitable aliphatic dianhydrides include but are not limited to: cyclobutane dianhydride; [1S*,5R*,6S*]-3-oxabicyclo[3.2.1]octane-2,4-dione-6-spiro-3-(tetrahydrofuran-2,5-dione); and mixtures thereof.

In some embodiments, the aromatic diamine is selected from the group consisting of: 3,4'-oxydianiline; 1,3-bis-(4-aminophenoxy) benzene; 4,4'-oxydianiline; paraphenylenediamine; 1,3-diaminobenzene; 2,2'-bis(trifluoromethyl) benzidene; 4,4'-diaminobiphenyl; 4,4'-diaminodiphenyl sulfide; 9,9'-bis(4-amino)fluorine; mixtures and derivatives thereof.

In another embodiment, the aromatic diamine is selected from a group consisting of: 4,4'-diaminodiphenyl propane; 4,4'-diamino diphenyl methane; benzidine; 3,3'-dichlorobenzidine; 3,3'-diamino diphenyl sulfone; 4,4'-diamino diphenyl sulfone; 1,5-diamino naphthalene; 4,4'-diamino diphenyl diethylsilane; 4,4'-diamino diphenysilane; 4,4'-diamino diphenyl ethyl phosphine oxide; 4,4'-diamino diphenyl N-methyl amine; 4,4'-diamino diphenyl N-phenyl amine; 1,4-diaminobenzene (paraphenylenediamine); 1,2-diaminobenzene; mixtures and derivatives thereof.

In some embodiments, examples of suitable aliphatic diamines include: hexamethylene diamine, dodecane diamine, cyclohexane diamine and mixtures thereof.

In one embodiment, the first polyimide layer comprises a polyimide derived from pyromellitic dianhydride and 4,4'-oxydianiline.

In some embodiments, the first polyimide layer is between and including any two of the following thicknesses: 8, 10, 20, 30, 40, 50, 60, 70, 80, 90, 100, 110, 120 and 130 microns thick. In another embodiment, the first polyimide layer is from 8 to 130 microns thick. In another embodiment, the first polyimide layer is from 10 to 30 microns thick. In another embodiment, the first polyimide layer is from 12 to 25 microns thick.

The first polyimide layer may optionally contain 1 to 15 wt % low conductivity carbon black. In some embodiments the first polyimide layer contains between and including any two of the following: 1, 5, 10 and 15 wt % low conductivity carbon black. In yet another embodiment, the first polyimide layer contains 2 to 9 wt % low conductivity carbon black.

Low conductivity carbon black is intended to mean, channel type black, furnace black or lamp black. In some embodiments, the low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polyamic acid solution (polyimide precursor), which in turn can be imidized into a (well dispersed) filled polyimide base polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content. Typically, a low conductivity carbon black has a pH less than 6.

A uniform dispersion of isolated, low conductivity carbon black particles (aggregates) not only decreases the electrical conductivity, but additionally tends to produce uniform color intensity. In some embodiments the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 microns.

The first polyimide layer may optionally contain 1 to 40 wt % pigment or dye. In some embodiments the first polyimide layer contains 1 to 40 wt % of a mixture of pigments and dyes. In some embodiments, the first polyimide layer contains between and including any two of the following: 1, 5, 10, 15, 20, 25, 30, 35 and 40 wt % pigment, dye or mixtures thereof. In some embodiments, the first polyimide layer contains 1 to 40 wt % of a mixture of at least two of the following: low conductivity carbon black, pigments or dyes.

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, (Fe,Mn)2O3 black, copper chromite black spinel, lampblack, bone black, bone ash, bone char, hematite, black iron oxide, micaceous iron oxide, black complex inorganic color pigments (CICP), (Ni,Mn,Co)(Cr,Fe)2O4 black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Brown 35, Pigment Black 30, Pigment Black 32, Pigment Black 33 or mixtures thereof.

In some embodiments, the pigment is lithopone, zinc sulfide, barium sulfate, cobalt oxide, yellow iron oxide, orange iron oxide, red iron oxide, brown iron oxide, hematite, black iron oxide, micaceous iron oxide, chromium (III) green, ultramarine blue, ultramarine violet, ultramarine pink, cyanide iron blue, cadmium pigments or lead chromate pigments.

In some embodiments, the pigment is complex inorganic color pigments (CICP) such as spinel pigments, rutile pigments, zircon pigments or bismuth vanadate yellow. In some embodiments, useful spinel pigments include but are not limited to: Zn(Fe,Cr)2O4 brown, CoAl2O4 blue, Co(AlCr)2O4 blue-green, Co2TiO4 green, CuCr2O4 black or (Ni,Mn,Co)(Cr,Fe)2O4 black. In some embodiments, useful rutile pigments include but are not limited to: Ti—Ni—Sb yellow, Ti—Mn—Sb brown, Ti—Cr—Sb buff, zircon pigments or bismuth vanadate yellow.

In another embodiment, the pigment is an organic pigment. In some embodiments, useful organic pigments include but are not limited to: Aniline black (Pigment Black 1), Anthraquinone black, Monoazo type, Diazo type, Benzimidazolones, Diarylide yellow, Monoazo yellow salts, Dinitaniline orange, Pyrazolone orange, Azo red, Naphthol red, Azo condensation pigments, Lake pigments, Copper Phthalocyanine blue, Copper Phthalocyanine green, Quinacridones, Diaryl Pyrrolopyrroles, Aminoanthraquinone pigments, Dioxazines, Isoindolinones, Isoindolines, Quinophthalones, phthalocyanine pigments, idanthrone pigments, pigment violet 1, pigment violet 3, pigment violet 19 or pigment violet 23. In yet another embodiment, the organic pigment is a Vat dye pigment, such as but not limited to: perylene, perylene black, perinones or thioindigo.

A uniform dispersion of isolated, individual pigment particles (aggregates) tends to produce uniform color intensity. In some embodiments the pigment is milled. In some embodiments, the mean particle size of the pigment is between (and optionally including) any two of the following sizes: 0.2, 0.3, 0.4, 0.5, 0.6, 0.7, 0.8, 0.9 and 1.0 microns. In some embodiments, luminescent (fluorescent or phosphorescent), or pearlescent pigments can be used, alone, or in combination with other pigments or dyes.

In some embodiments, the first polyimide layer further comprises 1 to 20 wt % of a matting agent selected from silica, alumina, zirconia, boron nitride, barium sulfate, polyimide particles, calcium phosphate, talc or mixtures thereof. In another embodiment, the first polyimide layer further comprises 1 to 20 wt % of a matting agent that is a carbon black having a mean particle size from 2 to 9 micrometers. In yet another embodiment, the first polyimide layer further comprises 1 to 20 wt % of a matting agent, the matting agent being a mixture of
  i) carbon black having a mean particle size from 2 to 9 microns; and
  ii) silica, alumina, zirconia, boron nitride, barium sulfate, polyimide particles, calcium phosphate, talc or mixtures thereof.

In some embodiments, the first polyimide layer is Kapton® MBC polyimide film manufactured by DuPont.

In some embodiments, the first polyimide layer comprises:
  i) a chemically converted polyimide in an amount from 71 to 96 wt %, the chemically converted polyimide being derived from:
    a. at least 50 mole percent of an aromatic dianhydride, based upon a total dianhydride content of the polyimide, and
    b. at least 50 mole percent of an aromatic diamine, based upon a total diamine content of the polyimide;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc.

In a chemical conversion process, the polyamic acid solution is either immersed in or mixed with conversion (imidization) chemicals. In one embodiment, the conversion chemicals are tertiary amine catalysts (accelerators) and anhydride dehydrating materials. In one embodiment, the anhydride dehydrating material is acetic anhydride, which is often used in molar excess relative to the amount of amic acid (amide acid) groups in the polyamic acid, typically about 1.2 to 2.4 moles per equivalent of polyamic acid. In one embodiment, a comparable amount of tertiary amine catalyst is used.

Alternatives to acetic anhydride as the anhydride dehydrating material include: i. other aliphatic anhydrides, such as, propionic, butyric, valeric, and mixtures thereof; ii. anhydrides of aromatic monocarboxylic acids; iii. Mixtures of aliphatic and aromatic anhydrides; iv. carbodimides; and v. aliphatic ketenes (ketenes may be regarded as anhydrides of carboxylic acids derived from drastic dehydration of the acids).

In one embodiment, the tertiary amine catalysts are pyridine and beta-picoline and are typically used in amounts similar to the moles of anhydride dehydrating material. Lower or higher amounts may be used depending on the desired conversion rate and the catalyst used. Tertiary amines having approximately the same activity as the pyridine, and beta-picoline may also be used. These include alpha picoline; 3,4-lutidine; 3,5-lutidine; 4-methyl pyridine; 4-isopropyl pyridine; N,N-dimethylbenzyl amine; isoquinoline; 4-benzyl pyridine, N,N-dimethyldodecyl amine, triethyl amine, and the like. A variety of other catalysts for imidization are known in the art, such as imidazoles, and may be useful in accordance with the present disclosure.

The conversion chemicals can generally react at about room temperature or above to convert polyamic acid to polyimide. In one embodiment, the chemical conversion reaction occurs at temperatures from 15° C. to 120° C. with the reaction being very rapid at the higher temperatures and relatively slower at the lower temperatures.

In one embodiment, the chemically treated polyamic acid solution can be cast or extruded onto a heated conversion surface or substrate. In one embodiment, the chemically treated polyamic acid solution can be cast on to a belt or drum. The solvent can be evaporated from the solution, and the polyamic acid can be partially chemically converted to polyimide. The resulting solution then takes the form of a polyamic acid-polyimide gel. Alternately, the polyamic acid solution can be extruded into a bath of conversion chemicals consisting of an anhydride component (dehydrating agent), a tertiary amine component (catalyst) or both with or without a diluting solvent. In either case, a gel film is formed and the percent conversion of amic acid groups to imide groups in the gel film depends on contact time and temperature but is usually about 10 to 75 percent complete. For curing to a solids level greater than 98%, the gel film typically must be dried at elevated temperature (from about 200° C., up to about 550° C.), which will tend to drive the imidization to completion. In some embodiments, the use of both a dehydrating agent and a catalyst is preferred for facilitating the formation of a gel film and achieve desired conversion rates.

Second Polyimide Layer

The second polyimide layer comprises 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide. In some embodiments, the second polyimide layer comprises between and including any two of the following: 25, 30, 35, 40, 45 and 50 wt % of a polyimide. In another embodiment, the second polyimide layer comprises 33 to 39 wt % of a polyimide.

In one embodiment, the aromatic dianhydride is selected from the group consisting of:
  pyromellitic dianhydride;
  3,3',4,4'-biphenyl tetracarboxylic dianhydride;
  3,3',4,4'-benzophenone tetracarboxylic dianhydride;
  4,4'-oxydiphthalic anhydride;
  3,3',4,4'-diphenyl sulfone tetracarboxylic dianhydride;
  2,2-bis(3,4-dicarboxyphenyl) hexafluoropropane;
  Bisphenol A dianhydride; and
  mixtures and derivatives thereof.

In another embodiment, the aromatic dianhydride is selected from the group consisting of:
  2,3,6,7-naphthalene tetracarboxylic dianhydride;
  1,2,5,6-naphthalene tetracarboxylic dianhydride;
  2,2',3,3'-biphenyl tetracarboxylic dianhydride;
  2,2-bis(3,4-dicarboxyphenyl) propane dianhydride;
  bis(3,4-dicarboxyphenyl) sulfone dianhydride;
  3,4,9,10-perylene tetracarboxylic dianhydride;

1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
oxydiphthalic dianhydride;
bis(3,4-dicarboxyphenyl) sulfone dianhydride;
mixtures and derivatives thereof.

In some embodiments, examples of suitable aliphatic dianhydrides include but are not limited to: cyclobutane dianhydride; [1S*,5R*,6S*]-3-oxabicyclo[3.2.1]octane-2,4-dione-6-spiro-3-(tetrahydrofuran-2,5-dione); and mixtures thereof.

In some embodiments, the aromatic diamine is selected from the group consisting of: 3,4'-oxydianiline; 1,3-bis-(4-aminophenoxy) benzene; 4,4'-oxydianiline; paraphenylenediamine; 1,3-diaminobenzene; 2,2'-bis(trifluoromethyl) benzidene; 4,4'-diaminobiphenyl; 4,4'-diaminodiphenyl sulfide; 9,9'-bis(4-amino)fluorine; mixtures and derivatives thereof.

In another embodiment, the aromatic diamine is selected from a group consisting of: 4,4'-diaminodiphenyl propane; 4,4'-diamino diphenyl methane; benzidine; 3,3'-dichlorobenzidine; 3,3'-diamino diphenyl sulfone; 4,4'-diamino diphenyl sulfone; 1,5-diamino naphthalene; 4,4'-diamino diphenyl diethylsilane; 4,4'-diamino diphenysilane; 4,4'-diamino diphenyl ethyl phosphine oxide; 4,4'-diamino diphenyl N-methyl amine; 4,4'-diamino diphenyl N-phenyl amine; 1,4-diaminobenzene (paraphenylene diamine); 1,2-diaminobenzene; mixtures and derivatives thereof.

In some embodiments, examples of suitable aliphatic diamines include: hexamethylene diamine, dodecane diamine, cyclohexane diamine and mixtures thereof.

In one embodiment, the second polyimide layer comprises a polyimide derived from pyromellitic dianhydride and 4,4'-oxydianiline or derived from pyromellitic dianhydride, 4,4'-oxydianiline and paraphenylenediamine. In another embodiment, the second polyimide layer comprises a polyimide derived from 3,3',4,4'-biphenyl tetracarboxylic dianhydride, pyromellitic dianhydride, 4,4'-oxydianiline and paraphenylenediamine. In another embodiment, the second polyimide layer comprises a polyimide derived from i) blocks of pyromellitic dianhydride and 4,4'-oxydianiline and ii) blocks of pyromellitic dianhydride and paraphenylenediamine. In yet another embodiment, the second polyimide layer comprises a polyimide derived from 3,3',4,4'-biphenyl tetracarboxylic dianhydride, pyromellitic dianhydride, 4,4'-oxydianiline and paraphenylenediamine. In yet another embodiment, the first polyimide layer comprises a polyimide derived from pyromellitic dianhydride and 4,4'-oxydianiline, and the second polyimide layer comprises a polyimide derived from i) pyromellitic dianhydride and 4,4'-oxydianiline, or derived from
ii) pyromellitic dianhydride, 4,4'-oxydianiline and paraphenylenediamine, or derived from
iii) blocks of pyromellitic dianhydride and 4,4'-oxydianiline and blocks of pyromellitic dianhydride and paraphenylenediamine, or derived from
iv) 3,3',4,4'-biphenyl tetracarboxylic dianhydride, pyromellitic dianhydride, 4,4'-oxydianiline and paraphenylenediamine.

In some embodiments, the second polyimide layer is thinner than the first polyimide layer. Typically the second polyimide layer is highly filled, and the first polyimide layer must provide mechanical support. Thus it is desirable to have a thin second polyimide layer. In some embodiments, the second polyimide layer is from 0.5 to 20 microns thick. In some embodiments, the second polyimide layer is between and including any two of the following thicknesses: 0.5, 1, 5, 10, 15, and 20 microns thick. In yet another embodiment, the second layer is from 0.7 to 10 microns thick. In some embodiments, the second layer is from 0.7 to 3 microns thick.

The second layer is in direct contact with the first polyimide layer. The term "direct contact" is intended to mean two surfaces adjacent to each other without an intervening material or adhesive layer between the two surfaces.

The second polyimide layer comprises greater than 0 and less than 20 wt % of at least one submicron carbon black. The term "submicron" is intended to mean less than one micron in all dimensions. In another embodiment, the second polyimide layer comprises from 5 to 15 wt % of at least one submicron carbon black. In another embodiment, the second polyimide layer comprises greater than 7 and less than 11 wt % of at least one submicron carbon black. In another embodiment, the second polyimide layer comprises from 8 to 10 wt % of at least one submicron carbon black. The submicron carbon black, for the purpose of the present disclosure, is intended to be the colorant. One of ordinary skill in the art could also envision the use of other colorants (pigments or dyes) to create any desired color. In some embodiments, the same pigment or dye used in the second polyimide layer may be used in the first polyimide layer. In yet another embodiment, the colorant in the second polyimide layer could be different from any colorant that may be used in the first polyimide layer.

The second polyimide layer comprises 15 to 35 wt % of polyimide particle matting agent. In some embodiments, the second polyimide layer comprises between and including any two of the following: 15, 16, 17, 18, 19, 20, 25, 30, 31, 32, 33, 34 and 35 wt % of polyimide particle matting agent. In another embodiment, comprises 19 to 31 wt % of polyimide particle matting agent. In some embodiments, the second polyimide layer comprises a mixture of polyimide particle matting agents or a mixture of polyimide particle matting agent and another matting agent such as, silica, alumina, zirconia, boron nitride, barium sulfate, calcium phosphate and talc.

The polyimide particle matting agent has a median particle size of 2 to 11 microns. In some embodiments, the polyimide particle matting agent has a median particle size between and including any two of the following: 2, 3, 4, 5, 6, 7, 8, 9, 10 and 11 microns. In some embodiments the average particle size is 2 to 11 microns. The particle size of the polyimide particle matting agent can be measured in the slurries by laser diffraction using either a Horiba LA-930 (Horiba, Instruments, Inc., Irvine Calif.) or a Malvern Mastersizer 3000 (Malvern Instruments, Inc., Westborough, Mass.).

The polyimide particle matting agent is derived from at least one aromatic dianhydride and at least one aromatic diamine. In one embodiment, the polyimide particle matting agent is derived from pyromellitic dianhydride and 4,4'-oxydianiline.

In some embodiments, the polyimide particle matting agent is a pigmented polyimide particle matting agent. Pigmented polyimide particles are comprised of a polyimide and a colorant. Pigmented polyimide particles have a color different from the polyimide by itself. Virtually any colorant can be used, including but not limited to inorganic pigments, complex inorganic color pigments, organic pigments, and dyes. Useful black colorants include carbon black, graphite, aniline black, and perylene black. Useful white colorants include titanium dioxide. The colorant may be incorporated into the polyimide particles, such as by absorption, or dispersed as a separate phase within the polyimide particles. Some or all of the colorant may be on the surface of the polyimide particles. The surface of the particles may be partially or completely covered with the colorant. Pigmented polyimide particles may be produced by a variety of methods, including but not limited to the following: incorporation of the colorant into the polyimide particles during the process of particle formation by precipitation from solution; absorption, imbibition, or diffusion of the colorant into the polyimide particles; coating of the colorant onto the polyimide particles. The pigmented polyimide particles may contain from 1 wt % to 70 wt % colorant. In some embodiments, the pigmented polyimide particles may contain from 1 wt % to 50 wt % colorant. Pigmented polyimide particle matting agents useful in the present disclosure include those disclosed in U.S. Pat. application 2014/0220335, the disclosure of which are hereby incorporated by reference.

In some embodiments, the second polyimide layer comprises 15 to 35 wt % of pigmented polyimide particle matting agent. In some embodiments, the second polyimide layer comprises between and including any two of the following: 15, 16, 17, 18, 19, 20, 25, 30, 31, 32, 33, 34 and 35 wt % of pigmented polyimide particle matting agent. In another embodiment, comprises 19 to 31 wt % of pigmented polyimide particle matting agent.

In some embodiments, the pigmented polyimide particle matting agent is derived from pyromellitic dianhydride and 4,4'-oxydianiline. In some embodiments, the pigmented polyimide particle matting agent is derived from pyromellitic dianhydride and 4,4'-oxydianiline and graphite as the colorant (pigment).

In some embodiments, the polyimide particle matting agent is derived from pyromellitic dianhydride and 4,4'-oxydianiline and the polyimide of the second polyimide layer is derived from pyromellitic dianhydride, 4,4'-oxydianiline and paraphenylenediamine. In some embodiments, the pigmented polyimide particle matting agent is derived from pyromellitic dianhydride, 4,4'-oxydianiline and colorant and the polyimide of the second polyimide layer is derived from pyromellitic dianhydride, 4,4'-oxydianiline and paraphenylenediamine. In some embodiments, the pigmented polyimide particle matting agent is derived from pyromellitic dianhydride, 4,4'-oxydianiline and graphite and the polyimide of the second polyimide layer is derived from pyromellitic dianhydride, 4,4'-oxydianiline and paraphenylenediamine.

Multilayer Film

The multilayer film in accordance with the present disclosure has a first polyimide layer and a second polyimide layer as described above. The multilayer film has an L* color less than 30 and a 60 degree gloss value less than 10 as well as durability to handling and circuit processing. The L* color is measured using a HunterLab ColorQuest® XE color meter (Hunter Associates Laboratory, Inc.) in the reflectance, specular included mode and reported in the CIELAB 10°/D65 system, as L*, a*, b*. A L* value of 0 is pure black, while a L* value of 100 is pure white. The 60 degree gloss was measured using a Micro-TRI-gloss glossmeter (from BYK-Gardner).

FIG. 1 illustrates one embodiment of the present disclosure, a multilayer film comprising an adhesive layer 60 in direct contact with the first polyimide layer 10 opposite the second polyimide layer 20, wherein the second polyimide layer comprises a polyimide particle matting agent 30, a submicron carbon black 40 and a submicron fumed metal oxide 50. In some embodiments, the adhesive layer is an epoxy adhesive selected from the group consisting of: Bisphenol A type epoxy resin, cresol novolac type epoxy resin, phosphorus containing epoxy resin, and mixtures thereof. Typically, an adhesive layer is as thick as or thicker than the first polyimide layer or the second polyimide layer. In some embodiments the adhesive layer is from 8 to 300 microns thick.

In some embodiments, the adhesive is a mixture of two or more epoxy resins. In some embodiments, the adhesive is a mixture of the same epoxy resin having different molecular weights.

In some embodiments, the epoxy adhesive contains a hardener. In some embodiments, the epoxy adhesive contains a catalyst. In some embodiments, the epoxy adhesive contains an elastomer toughening agent. In some embodiments, the epoxy adhesive contains a flame retardant.

In some embodiments, the multilayer film further comprises a third polyimide layer. In some embodiments, the third polyimide layer is from 0.5 to 20 microns thick. In another embodiment, the third polyimide layer is between and including any two of the following thicknesses: 0.5, 1, 5, 10, 15 and 20 micron thick. In some embodiments, the third polyimide layer is from 0.7 to 10 microns thick. In some embodiments, the third polyimide layer is from 0.7 to 3 microns thick. In some embodiments, the multilayer film further comprises a third polyimide layer from 0.5 to 20 microns thick in direct contact with the first polyimide layer opposite the second polyimide layer.

A third polyimide layer, is particularly desired when the multilayer film is coextruded. The third polyimide layer, when similar to or the same as the second polyimide layer helps prevent curl. The third polyimide layer may be the same as, or different from, the second polyimide layer.

In some embodiments, the multilayer film further comprises a third polyimide layer from 0.5 to 20 microns thick in direct contact with the first polyimide layer opposite the second polyimide layer, the third polyimide layer comprising:

i) a polyimide derived from at least 50 mole percent of an aromatic dianhydride, based upon a total dianhydride content of the polyimide, and at least 50 mole percent of an aromatic diamine based upon a total diamine content of the polyimide; and ii) a matting agent or mixture thereof.

In one embodiment, the matting agent in the third polyimide layer is selected from silica, alumina, zirconia, boron nitride, barium sulfate, polyimide particles, calcium phosphate, talc or mixtures thereof. In another embodiment, the matting agent in the third polyimide layer is a carbon black having a mean particle size from 2 to 9 microns. In yet another embodiment, the matting agent in the third polyimide layer is a mixture of i) carbon black having a mean particle size from 2 to 9 microns; and ii) silica, alumina, zirconia, boron nitride, barium sulfate, polyimide particles, calcium phosphate, talc or mixtures thereof. In another embodiment, the matting agent in the third polyimide layer is polyimide particle matting agent. In yet another embodiment, the matting agent in the third polyimide layer is pigmented polyimide particle matting agent.

In another embodiment, the third polyimide layer comprises 15 to 35 wt % of polyimide particle matting agent. In some embodiments, the third polyimide layer comprises between and including any two of the following: 15, 16, 17, 18, 19, 20, 25, 30, 31, 32, 33, 34 and 35 wt % of polyimide particle matting agent. In another embodiment, the third polyimide layer comprises 19 to 31 wt % of polyimide particle matting agent. In some embodiments, the third polyimide layer comprises a mixture of polyimide particle matting agents or a mixture of polyimide particle matting agent and another matting agent such as, silica, alumina, zirconia, boron nitride, barium sulfate, calcium phosphate and talc.

The polyimide particle matting agent has a median particle size of 2 to 11 microns. In some embodiments, the polyimide particle matting agent has a median particle size between and including any two of the following: 2, 3, 4, 5, 6, 7, 8, 9, 10 and 11 microns. In some embodiments the average particle size is 2 to 11 microns. The particle size of the polyimide particle matting agent can be measured in the slurries by laser diffraction using either a Horiba LA-930 (Horiba, Instruments, Inc., Irvine Calif.) or a Malvern Mastersizer 3000 (Malvern Instruments, Inc., Westborough, Mass.).

The polyimide particle matting agent is derived from at least one aromatic dianhydride and at least one aromatic diamine. In one embodiment, the polyimide particle matting agent is derived from pyromellitic dianhydride and 4,4'-oxydianiline.

In some embodiments, the polyimide particle matting agent is a pigmented polyimide particle matting agent. Pigmented polyimide particles are comprised of a polyimide and a colorant. Pigmented polyimide particles have a color different from the polyimide by itself. Virtually any colorant can be used, including but not limited to inorganic pigments, complex inorganic color pigments, organic pigments, and dyes. Useful black colorants include carbon black, graphite, aniline black, and perylene black. Useful white colorants include titanium dioxide. The colorant may be incorporated into the polyimide particles, such as by absorption, or dispersed as a separate phase within the polyimide particles. Some or all of the colorant may be on the surface of the polyimide particles. The surface of the particles may be partially or completely covered with the colorant. Pigmented polyimide particles may be produced by a variety of methods, including but not limited to the following: incorporation of the colorant into the polyimide particles during the process of particle formation by precipitation from solution; absorption, imbibition, or diffusion of the colorant into the polyimide particles; coating of the colorant onto the polyimide particles. The pigmented polyimide particles may contain from 1 to 70 wt % colorant. In some embodiments, the pigmented polyimide particles may contain from 1 to 50 wt % colorant. Pigmented polyimide particle matting agents useful in the present disclosure include those disclosed in U.S. Pat. application 2014/0220335, the disclosure of which are hereby incorporated by reference.

In some embodiments, the third polyimide layer comprises 15 to 35 wt % of pigmented polyimide particle matting agent. In some embodiments, the third polyimide layer comprises between and including any two of the following: 15, 16, 17, 18, 19, 20, 25, 30, 31, 32, 33, 34 and 35 wt % of pigmented polyimide particle matting agent. In another embodiment, comprises 19 to 31 wt % of pigmented polyimide particle matting agent.

In some embodiments, the pigmented polyimide particle matting agent is derived from pyromellitic dianhydride and 4,4'-oxydianiline. In some embodiments, the pigmented polyimide particle matting agent is derived from pyromellitic dianhydride and 4,4'-oxydianiline and graphite as the colorant (pigment).

In some embodiments, the polyimide particle matting agent is derived from pyromellitic dianhydride and 4,4'-oxydianiline and the polyimide of the third polyimide layer is derived from pyromellitic dianhydride, 4,4'-oxydianiline and paraphenylenediamine. In some embodiments, the pigmented polyimide particle matting agent is derived from pyromellitic dianhydride, 4,4'-oxydianiline and colorant and the polyimide of the third polyimide layer is derived from pyromellitic dianhydride, 4,4'-oxydianiline and paraphenylenediamine. In some embodiments, the pigmented polyimide particle matting agent is derived from pyromellitic dianhydride, 4,4'-oxydianiline and graphite and the polyimide of the third polyimide layer is derived from pyromellitic dianhydride, 4,4'-oxydianiline and paraphenylenediamine.

In one embodiment, the third polyimide layer comprises a polyimide derived from pyromellitic dianhydride and 4,4'-oxydianiline. In another embodiment, the third polyimide layer comprises a polyimide derived from pyromellitic dianhydride, 4,4'-oxydianiline and paraphenylenediamine. In another embodiment, the second polyimide layer comprises a polyimide derived from 3,3',4,4'-biphenyl tetracarboxylic dianhydride, pyromellitic dianhydride, 4,4'-oxydianiline and paraphenylenediamine. In another embodiment, the third polyimide layer comprises a polyimide derived from i) blocks of pyromellitic dianhydride and 4,4'-oxydianiline and ii) blocks of pyromellitic dianhydride and paraphenylenediamine.

In another embodiment, the multilayer film further comprises a third polyimide layer from 0.5 to 20 microns thick in direct contact with the first polyimide layer opposite the second polyimide layer; the third polyimide layer comprises:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black; and
  iv) 15 to 50 wt % of at least one submicron fumed metal oxide.

Figure 2:
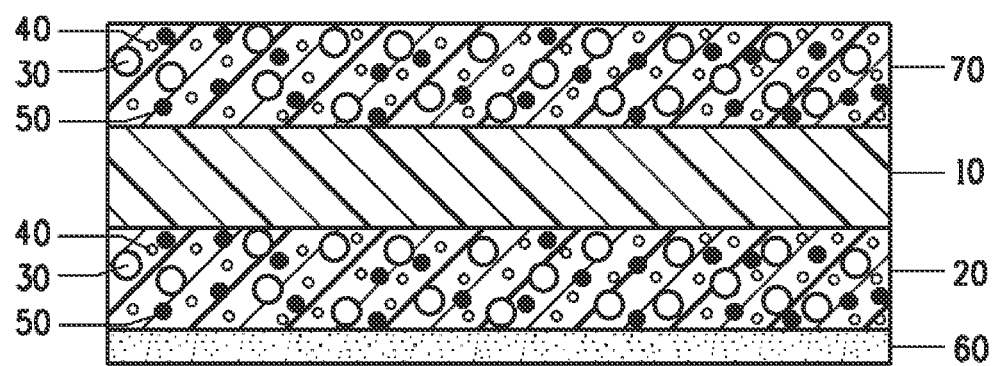
FIG. 2 illustrates a third polyimide layer, an adhesive layer in direct contact with the second polyimide layer on a surface of the second polyimide layer furthest from the first polyimide layer according to one embodiment of the present disclosure.

FIG. 2 illustrates another embodiment of the present disclosure, a multilayer film comprising a third polyimide layer 70 in direct contact with the first polyimide layer 10, an adhesive layer 60 in direct contact with the second polyimide layer 20 on a surface of the second polyimide layer furthest from the first polyimide layer 10, wherein the second polyimide layer and the third polyimide layer comprises a polyimide particle matting agent 30, a submicron carbon black 40 and a submicron fumed metal oxide 50. In yet another embodiment, an adhesive layer 60 may be in direct contact with the third polyimide layer 70 on a surface of the third polyimide furthest from the first polyimide layer 10.

In one embodiment, the multilayer film comprises:
  a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
  b. a second polyimide layer from 0.5 to 20 microns thick in direct contact with the first polyimide layer, the second polyimide layer comprising:
    i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
    ii) 15 to 35 wt % of polyimide particle matting agent;

iii) greater than 0 and less than 20 wt % of at least one submicron carbon black;

iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and
c. an adhesive layer in direct contact with the first polyimide layer opposite the second polyimide layer; wherein the adhesive layer is an epoxy resin selected from the group consisting of:

Bisphenol A type epoxy resin, cresol novolac type epoxy resin, phosphorus containing epoxy resin, and mixtures thereof; and wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black; and iv) 15 to 50 wt % of at least one submicron fumed metal oxide.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and
d. an adhesive layer in direct contact an adhesive layer in direct contact with the second polyimide layer on a surface of the second polyimide layer opposite from the first polyimide layer; wherein the adhesive layer is an epoxy resin selected from the group consisting of: Bisphenol A type epoxy resin, cresol novolac type epoxy resin, phosphorus containing epoxy resin, and mixtures thereof; and wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) 15 to 50 wt % of at least one submicron fumed metal oxide; and c. a third polyimide layer from 0.5 to 20 microns thick in direct contact with the first polyimide layer opposite the second polyimide layer, the third polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and
d. an adhesive layer in direct contact an adhesive layer in direct contact with the third polyimide layer on a surface of the third polyimide layer opposite from the first polyimide layer; wherein the adhesive layer is an epoxy resin selected from the group consisting of: Bisphenol A type epoxy resin, cresol novolac type epoxy resin, phosphorus containing epoxy resin, and mixtures thereof; and wherein the multilayer film has an L* color less than 30 and a 60 degree gloss value less than 10.

In one embodiment, the multilayer film comprises:
a. a first polyimide layer from 8 to 130 microns thick comprising:
  i) a polyimide derived from at least 50 mole percent of an aromatic dianhydride, based upon a total dianhydride content of the polyimide, and at least 50 mole percent of an aromatic diamine based upon a total diamine content of the polyimide;
  ii) 1 to 15 wt % low conductivity carbon black, or 1 to 40 wt % pigment or dye;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer from 8 to 130 microns thick comprising:
  i) a polyimide derived from at least 50 mole percent of an aromatic dianhydride, based upon a total dianhydride content of the polyimide, and at least 50 mole percent of an aromatic diamine based upon a total diamine content of the polyimide;
  ii) 1 to 15 wt % low conductivity carbon black, or 1 to 40 wt % pigment or dye;
  iii) 1 to 20 wt % of a matting agent selected from silica, alumina, zirconia, boron nitride, barium sulfate, polyimide particles, calcium phosphate, talc or mixtures thereof;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer comprising:
  i) a chemically converted polyimide in an amount from 71 to 96 weight percent, the chemically converted polyimide being derived from: at least 50 mole percent of an aromatic dianhydride, based upon a total dianhydride content of the polyimide, and at least 50 mole percent of an aromatic diamine based upon a total diamine content of the polyimide;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) 15 to 35 wt % of polyimide particle matting agent;
  iii) greater than 0 and less than 20 wt % of at least one submicron carbon black;
  iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer comprising:
  i) a chemically converted polyimide in an amount from 71 to 96 weight percent, the chemically converted polyimide being derived from: at least 50 mole percent of an aromatic dianhydride, based upon a total dianhydride content of the polyimide, and at least 50 mole percent of an aromatic diamine based upon a total diamine content of the polyimide;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide ii) 15 to 35 wt % of polyimide particle matting agent;
iii) greater than 0 and less than 20 wt % of at least one submicron carbon black;
iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
   i) a polyimide derived from at least 50 mole percent of an aromatic dianhydride, based upon a total dianhydride content of the polyimide, and at least 50 mole percent of an aromatic diamine based upon a total diamine content of the polyimide;
   ii) a matting agent or mixture thereof; and
wherein the multilayer film has an L* color less than 30 and a 60 degree gloss value less than 10.

In one embodiment, the multilayer film comprises:
a. a first polyimide layer comprising:
   i) a chemically converted polyimide in an amount from 71 to 96 weight percent, the chemically converted polyimide being derived from: at least 50 mole percent of an aromatic dianhydride, based upon a total dianhydride content of the polyimide, and at least 50 mole percent of an aromatic diamine based upon a total diamine content of the polyimide;
   ii) a low conductivity carbon black present in an amount from 2 to 9 wt %; and
   iii) a matting agent that:
      a. is present in an amount from 1.6 to 10 wt %,
      b. has a median particle size from 1.3 to 10 microns, and
      c. has a density from 2 to 4.5 g/cc;
b. a second polyimide layer from 0.5 to 20 microns thick in direct contact with the first polyimide layer, the second polyimide layer comprising:
   i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide
   ii) 15 to 35 wt % of polyimide particle matting agent;
   iii) greater than 0 and less than 20 wt % of at least one submicron carbon black;
   iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
   i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
   ii) 15 to 35 wt % of polyimide particle matting agent;
   iii) greater than 0 and less than 20 wt % of at least one submicron carbon black;
   iv) 15 to 50 wt % of at least one submicron fumed metal oxide; and
wherein the multilayer film has an L* color less than 30 and a 60 degree gloss value less than 10.

In one embodiment, the multilayer film comprises:
a. a first polyimide layer from 8 to 130 microns thick comprising: a polyimide derived from pyromellitic dianhydride and 4,4'-oxydianiline;
b. a second polyimide layer from 0.5 to 20 microns thick in direct contact with the first polyimide layer, the second polyimide layer comprising:
   i) 25 to 50 wt % of a polyimide derived from
      a) pyromellitic dianhydride and 4,4'-oxydianiline,
      b) pyromellitic dianhydride, 4,4'-oxydianiline and paraphenylenediamine,
      c) blocks of pyromellitic dianhydride and 4,4'-oxydianiline and blocks of pyromellitic dianhydride and paraphenylenediamine, or
      d) 3,3',4,4'-biphenyl tetracarboxylic dianhydride, pyromellitic dianhydride, 4,4'-oxydianiline and paraphenylenediamine;
   ii) 15 to 35 wt % of polyimide particle matting agent;
   iii) greater than 0 and less than 20 wt % of at least one submicron carbon black;
   iv) 15 to 50 wt % of at least one submicron fumed metal oxide;
and wherein the multilayer film has an L* color less than 30 and a 60 degree gloss value less than 10.

In one embodiment, the multilayer film comprises:
a. a first polyimide layer comprising:
   i) a chemically converted polyimide in an amount from 71 to 96 weight percent, the chemically converted polyimide being derived from pyromellitic dianhydride and 4,4'-oxydianiline;
   ii) a low conductivity carbon black present in an amount from 2 to 9 wt %; and
   iii) a matting agent that:
      a. is present in an amount from 1.6 to 10 wt %,
      b. has a median particle size from 1.3 to 10 microns, and
      c. has a density from 2 to 4.5 g/cc;
b. a second polyimide layer from 0.5 to 20 microns thick in direct contact with the first polyimide layer, the second polyimide layer comprising:
   i) 25 to 50 wt % of a polyimide derived from
      a) pyromellitic dianhydride and 4,4'-oxydianiline,
      b) pyromellitic dianhydride, 4,4'-oxydianiline and paraphenylenediamine,
      c) blocks of pyromellitic dianhydride and 4,4'-oxydianiline and blocks of pyromellitic dianhydride and paraphenylenediamine, or
      d) 3,3',4,4'-biphenyl tetracarboxylic dianhydride, pyromellitic dianhydride, 4,4'-oxydianiline and paraphenylenediamine;
   ii) 15 to 35 wt % of polyimide particle matting agent;
   iii) greater than 0 and less than 20 wt % of at least one submicron carbon black;
   iv) 15 to 50 wt % of at least one submicron fumed metal oxide;
and wherein the multilayer film has an L* color less than 30 and a 60 degree gloss value less than 10.

In one embodiment, the multilayer film comprises:
a. a first polyimide layer comprising:
   i) a chemically converted polyimide in an amount from 71 to 96 weight percent, the chemically converted polyimide being derived from pyromellitic dianhydride and 4,4'-oxydianiline;
   ii) a low conductivity carbon black present in an amount from 2 to 9 wt %; and
   iii) a matting agent that:
      a. is present in an amount from 1.6 to 10 wt %,
      b. has a median particle size from 1.3 to 10 microns, and
      c. has a density from 2 to 4.5 g/cc;

b. a second polyimide layer from 0.5 to 20 microns thick in direct contact with the first polyimide layer, the second polyimide layer comprising:
   i) 25 to 50 wt % of a polyimide derived from
      a) pyromellitic dianhydride and 4,4'-oxydianiline,
      b) pyromellitic dianhydride, 4,4'-oxydianiline and paraphenylenediamine,
      c) blocks of pyromellitic dianhydride and 4,4'-oxydianiline and blocks of pyromellitic dianhydride and paraphenylenediamine, or
      d) 3,3',4,4'-biphenyl tetracarboxylic dianhydride, pyromellitic dianhydride, 4,4'-oxydianiline and paraphenylenediamine;
   ii) 15 to 35 wt % of polyimide particle matting agent;
   iii) greater than 0 and less than 20 wt % of at least one submicron carbon black;
   iv) 15 to 50 wt % of at least one submicron fumed metal oxide;

and wherein the multilayer film has an L* color less than 30 and a 60 degree gloss value less than 10.

c. a third polyimide layer from 0.5 to 20 microns thick in direct contact with the first polyimide layer opposite the second polyimide layer, the third polyimide layer comprising:
   i) 25 to 50 wt % of a polyimide derived from
      a) pyromellitic dianhydride and 4,4'-oxydianiline,
      b) pyromellitic dianhydride, 4,4'-oxydianiline and paraphenylenediamine,
      c) blocks of pyromellitic dianhydride and 4,4'-oxydianiline and blocks of pyromellitic dianhydride and paraphenylenediamine, or
      d) 3,3',4,4'-biphenyl tetracarboxylic dianhydride, pyromellitic dianhydride, 4,4'-oxydianiline and paraphenylenediamine;
   ii) 15 to 35 wt % of polyimide particle matting agent;
   iii) greater than 0 and less than 20 wt % of at least one submicron carbon black;
   iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer from 20 to 30 microns thick comprising: a polyimide derived pyromellitic dianhydride and 4,4'-oxydianiline;
b. a second polyimide layer from 0.7 to 3 microns thick in direct contact with the first polyimide layer, the second polyimide layer comprising:
   i) 25 to 50 wt % of a polyimide derived from pyromellitic dianhydride, 4,4'-oxydianiline and paraphenylenediamine;
   ii) 19 to 31 wt % of polyimide particle matting agent;
   v) greater than 7 and less than 11 wt % of at least one submicron carbon black;
   vi) 20 to 25 wt % of at least one submicron fumed metal oxide; and wherein the multilayer film has an L* color less than 30 and a 60 degree gloss value less than 10.

In one embodiment, the multilayer film comprises:
c. a first polyimide layer from 20 to 30 microns thick comprising: a polyimide derived pyromellitic dianhydride and 4,4'-oxydianiline;
d. a second polyimide layer from 0.7 to 3 microns thick in direct contact with the first polyimide layer, the second polyimide layer comprising:
   i) 25 to 50 wt % of a polyimide derived from pyromellitic dianhydride, 4,4'-oxydianiline and paraphenylenediamine;
   ii) 19 to 31 wt % of polyimide particle matting agent;
   vii) 8 to 10 wt % of at least one submicron carbon black;
   viii) 20 to 25 wt % of at least one submicron fumed metal oxide; and wherein the multilayer film has an L* color less than 30 and a 60 degree gloss value less than 10.

Another embodiment of the present disclosure is a method of producing a multilayer film having an L* color less than 30 and a 60 degree gloss value less than 10; the method comprising:
a. providing a first polyimide layer from 8 to 130 microns thick;
b. coating a second polyimide layer from 0.5 to 8 microns thick on to the first polyimide layer; the second polyimide layer comprising:
   i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide
   ii) 15 to 35 wt % of polyimide particle matting agent;
   iii) greater than 0 and less than 20 wt % of at least one submicron carbon black; and
   iv) 15 to 50 wt % of at least one submicron fumed metal oxide.

The first polyimide layer and the second polyimide layer of the present disclosure can be made by any well-known method in the art for making filled polyimide films. In some embodiments, the first polyimide layer and the second polyimide layer are made by a thermal conversion process (thermally imidized) in which the polyamic acid solution is heated to temperatures typically greater than 250° C. to convert the polyamic acid to a polyimide. In another embodiment, the first polyimide layer and the second polyimide layer are made by a chemical conversion process (chemically imidized). In one embodiment, one such method includes preparing a pigment slurry. The slurry may or may not be milled using a ball mill or continuous media mill to reach the desired particle size. The slurry may or may not be filtered to remove any residual large particles. A polyamic acid prepolymer solution is prepared by reacting dianhydride with a slight excess of diamine. The polyamic acid solution is mixed in a high shear mixer with the pigment slurry. The amount of the polyamic acid solution, pigment slurry, and finishing solution can be adjusted to achieve the desired loading levels of pigment and the desired viscosity for film formation. "Finishing solution" herein denotes a dianyhdride in a polar aprotic solvent which is added to a prepolymer solution to increase the molecular weight and viscosity. The dianhydride used is typically the same dianhydride used (or one of the same dianhydrides when more than one is used) to make the prepolymer. The mixture can be metered through a slot die and cast or manually cast onto a smooth stainless steel belt or substrate to produce a gel film. Conversion chemicals can be metered in before casting using a slot die. For conversion to greater than 98 percent solids level, the gel film typically must be dried at elevated temperature (convective heating from 200-300° C. and radiant heating from 400-800° C.), which will tend to drive the imidization to completion. In yet another embodiment, the first polyimide layer and the second polyimide layer are independently made by either a thermal conversion process or a chemical conversion process.

The multilayer film of the present disclosure can be prepared by any well-known method such as but not limited to coextrusion, lamination (laminating single layers together), coating and combinations thereof. A description of a coextrusion process for preparing multilayer polyimide films is provided in EP 0659553 A1 to Sutton et al. Coating methods include, but are not limited to, spray coating, curtain coating, knife over roll, air knife, extrusion/slot die, gravure, reverse gravure, offset gravure, roll coating, and dip/immersion.

In some embodiments, the multilayer film is prepared by simultaneously extruding (coextruding) the first polyimide layer and the second polyimide layer. In some embodiments, the multilayer film is prepared by simultaneously extruding (coextruding) the first polyimide layer, the second polyimide layer and the third polyimide layer. In some embodiments, the layers are extruded through a single or multi-cavity extrusion die. In another embodiment, the multilayer film is produced using a single-cavity die. If a single-cavity die is used, the laminar flow of the streams should be of high enough viscosity to prevent comingling of the streams and to provide even layering. In some embodiments, the multilayer film is prepared by casting from the slot die onto a moving stainless steel belt. In one embodiment, the belt is then passed through a convective oven, to evaporate solvent and partially imidize the polymer, to produce a "green" film. The green film can be stripped off the casting belt and wound up. The green film can then be passed through a tenter oven to produce a fully cured polyimide film. In some embodiments, during tentering, shrinkage can be minimized by constraining the film along the edges (i.e. using clips or pins).

In some embodiments, the multilayer film is made by coating a solution of silica matting agent, submicron carbon black and submicron fumed metal oxide slurries and polyamic acid on the first polyimide layer. The coating is heated to dry. The resulting multilayer film is placed on a pin frame to hold it flat. The coating can be cured in a batch or continuous oven capable of heating to at least 250° C. The oven temperature is ramped to 320° C. over a period of 45 to 60 minutes, then transferred to a 400° C. oven and held for 5 minutes. In some embodiments, chemical imidization catalysts and/or dehydrating agents can be added to the coating solution.

Another embodiment of the present disclosure is, a method of reducing the amount of colorant in a multilayer film and achieving an L* color less than 30 and a 60 degree gloss value less than 10, the method comprising;
 a) providing a first polyimide layer or a first polyamic acid solution or a first polyamic acid green film;
 b) providing a second polyamic acid solution containing polyamic acid, silica matting agent, and submicron carbon black;
 c) adding at least one submicron fumed metal oxide to the second polyamic acid solution;
 d) coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
 f) imidizing the coating formed in step d to form a second polyimide layer on the first polyimide layer, or imidizing the coating formed in step d and the first polyamic acid green film to form a first polyimide layer and a second polyimide layer, or imidizing the coextruded layers formed in step d to form a first polyimide layer and a second polyimide layer.

In yet another embodiment of the present disclosure is, a method of reducing the amount of colorant in a multilayer film and achieving an L* color less than 30 and a 60 degree gloss value less than 10, the method comprising;
 a) providing a first polyimide layer or a first polyamic acid solution or a first polyamic acid green film derived from pyromellitic dianhydride and 4,4'-oxydianiline;
 b) providing a second polyamic acid solution containing polyamic acid, polyimide particle matting agent, and submicron carbon black; wherein the polyamic acid is derived from pyromellitic dianhydride and 4,4'-oxydianiline, or derived from pyromellitic dianhydride, 4,4'-oxydianiline and paraphenylenediamine, or derived from 3,3',4,4'-biphenyl tetracarboxylic dianhydride, pyromellitic dianhydride, 4,4'-oxydianiline and paraphenylenediamine, or derived from i) blocks of pyromellitic dianhydride and 4,4'-oxydianiline and ii) blocks of pyromellitic dianhydride and paraphenylenediamine;
 c) adding 15 to 50 wt % of at least one submicron fumed metal oxide to the second polyamic acid solution;
 d) coating the polyamic acid solution formed in step c on to the first polyimide layer or, coating the polyamic acid solution formed in step c on to the first polyamic acid green film; or coextruding the polyamic acid solution formed in step c and the first polyamic acid solution; and
 f) imidizing the coating formed in step d to form a second polyimide layer on the first polyimide layer, or imidizing the coating formed in step d and the first polyamic acid green film to form a first polyimide layer and a second polyimide layer, or imidizing the coextruded layers formed in step d to form a first polyimide layer and a second polyimide layer; and wherein the second polyimide layer is in direct contact with the first polyimide layer.

Another embodiment of the present disclosure is a method of reducing the amount of colorant in a multilayer film and achieving an L* color less than 30 and a 60 degree gloss value less than 10, the method comprising:
 a) providing a component selected from the group consisting of: a first polyimide layer, a first polyamic acid solution and a first polyamic acid green film;
 b) providing a second polyamic acid solution containing polyamic acid, polyimide particle matting agent; and submicron carbon black;
 c) adding at least one submicron fumed metal oxide to the second polyamic acid solution;
 d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
 f) imidizing the composite formed in step d to produce a first polyimide layer and a second polyimide layer.

The submicron fumed metal oxide or mixtures thereof can be added directly to the second polyamic acid solution or by preparing a submicron fumed metal oxide slurry which is then added to the second polyamic acid solution. In some embodiments, the second polyamic acid solution is added to the submicron fumed metal oxide slurry. In some embodiments, the polyimide particle matting agent, the submicron carbon black and the submicron fumed metal oxide (and slurries thereof) may be combined in any order before coating the polyamic acid solution formed in step c on to the first polyimide layer; or coextruding the polyamic acid solution formed in step c and the first polyamic acid solution.

The polyamic acid formed in step c can be coated by methods well known in the art such as, but not limited to, spray coating, curtain coating, knife over roll, air knife, extrusion/slot die, gravure, reverse gravure, offset gravure, roll coating, and dip/immersion.

The coating or coextruded layers can be imidized by thermal conversion or chemical conversion as previously described.

In some embodiments, the first polyamic acid solution is partially dried and partly imidized to form a first polyamic acid green film. Then the polyamic acid solution formed in step c is coated on the first polyamic acid green film and both layers are imidized.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film;
  b) providing a second polyamic acid solution containing polyamic acid, polyimide particle matting agent, and submicron carbon black;
  c) adding at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer; and wherein the second polyimide layer is in direct contact with the first polyimide layer.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film and derived from pyromellitic dianhydride and 4,4'-oxydianiline,
  b) providing a second polyamic acid solution containing polyamic acid, polyimide particle matting agent, and submicron carbon black;
  c) adding at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer.

In yet another embodiment, the method of reducing amount of colorant in a multilayer film wherein the second polyimide layer comprises a polyimide derived from pyromellitic dianhydride and 4,4'-oxydianiline or derived from pyromellitic dianhydride, 4,4'-oxydianiline and paraphenylenediamine or derived from 3,3',4,4'-biphenyl tetracarboxylic dianhydride, pyromellitic dianhydride, 4,4'-oxydianiline and paraphenylenediamine or derived from i) blocks of pyromellitic dianhydride and 4,4'-oxydianiline and ii) blocks of pyromellitic dianhydride and paraphenylenediamine.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film and derived from pyromellitic dianhydride and 4,4'-oxydianiline,
  b) providing a second polyamic acid solution containing polyamic acid, polyimide particle matting agent, and submicron carbon black; wherein the polyamic acid is derived from pyromellitic dianhydride and 4,4'-oxydianiline, or derived from pyromellitic dianhydride, 4,4'-oxydianiline and paraphenylenediamine, or derived from 3,3',4,4'-biphenyl tetracarboxylic dianhydride, pyromellitic dianhydride, 4,4'-oxydianiline and paraphenylenediamine, or derived from i) blocks of pyromellitic dianhydride and 4,4'-oxydianiline and ii) blocks of pyromellitic dianhydride and paraphenylenediamine;
  c) adding at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film;
  b) providing a second polyamic acid solution containing polyamic acid, polyimide particle matting agent, and submicron carbon black;
  c) adding 15 to 50 wt % of at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film and derived from pyromellitic dianhydride and 4,4'-oxydianiline,
  b) providing a second polyamic acid solution containing polyamic acid, polyimide particle matting agent, and submicron carbon black; wherein the polyamic acid is derived from pyromellitic dianhydride and 4,4'-oxydianiline, or derived from pyromellitic dianhydride, 4,4'-oxydianiline and paraphenylenediamine, or derived from 3,3',4,4'-biphenyl tetracarboxylic dianhydride, pyromellitic dianhydride, 4,4'-oxydianiline and paraphenylenediamine, or derived from i) blocks of pyromellitic dianhydride and 4,4'-oxydianiline and ii) blocks of pyromellitic dianhydride and paraphenylenediamine;

c) adding 15 to 50 wt % of at least one submicron fumed metal oxide to the second polyamic acid solution;

d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and f) imidizing the composite formed in step d to produce a first polyimide layer and a second polyimide layer.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. Numerical values are to be understood to have the precision of the number of significant figures provided. For example, the number 1 shall be understood to encompass a range from 0.5 to 1.4, whereas the number 1.0 shall be understood to encompass a range from 0.95 to 1.04, including the end points of the stated ranges. It is not intended that the scope of the invention be limited to the specific values recited when defining a range.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

The materials, methods, and examples herein are illustrative only and, except as specifically stated, are not intended to be limiting. Although methods and materials similar or equivalent to those described herein can be used, suitable methods and materials are described herein.

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

EXAMPLES

Illustrative preparations and evaluations of films are described below.

Carbon Black Slurry (SB6 Carbon):

A carbon black slurry was prepared, consisting of 82 wt. % DMAC, 12 wt. % carbon black powder (Special Black 6, from Orion Engineered Carbons LLC), and 6 wt. % dispersing agent (Byk 9077, from Byk Chemie). The ingredients were thoroughly mixed in a high speed disc-type disperser. The slurry was then processed in a bead mill to disperse any agglomerates and to achieve the desired particle size. Median particle size was 0.14 microns.

Fumed Alumina Slurry

A fumed alumina slurry was prepared, consisting of 76.3 wt. % DMAC, 19.8 wt. % fumed alumina powder (Alu C805, from Evonik), and 3.9 wt. % dispersing agent (Disperbyk 180, from Byk Chemie). The ingredients were thoroughly mixed in a high speed disc-type disperser. The slurry was then processed in a bead mill to disperse any agglomerates and to achieve the desired particle size. Median particle size was 0.3 microns.

Polyimide Particle Slurry:

A polyimide particle slurry was prepared from a solution of PMDA/4,4'ODA polyamic acid in pyridine and heating the solution to precipitate the polymer. The pyridine solvent was displaced with deionized water and then comminuted in a high shear environment. The deionized water was displaced with DMAc to a 3.6 wt. % solids concentration. Median particle size was 4.0 microns.

Pigmented Polyimide Particle Slurry:

A pigmented polyimide particle slurry was prepared. Graphite powder was dispersed in a solution of PMDA/4,4'ODA polyamic acid in pyridine. The mixture was heated to form a precipitate of polyimide particles containing 40 weight % graphite. The pyridine solvent was displaced with deionized water, comminuted in a high shear environment, and then dried. The resulting powder was passed through a 325 mesh screen. The median particle size of the powder passing through the screen was 9.9 microns. The powder was dispersed in DMAC to form a 10 wt % dispersion of pigmented polyimide particles.

Kapton® MBC is an opaque matte black polyimide film manufactured by DuPont. It is based on PMDA/4,4'ODA polyimide, and contains approximately 5 wt. % carbon black and approximately 2 wt. % of a silica matting agent. It is available in various thicknesses.

PMDA/4,4'ODA/PPD (100/70/30 Mole Ratio) Co-Polyamic Acid Solution:

PPD was dissolved in DMAC at 40-45° C. to a concentration of approximately 2.27 wt. %. After reducing the temperature to 30-40° C., solid PMDA was added, with agitation, to achieve a PMDA:PPD stoichiometric ratio of approximately 0.99:1. The mixture was allowed to react for 90 minutes, with agitation. The mixture was diluted to approximately 5.8-6.5% solids by addition of DMAC. 4,4'ODA was then added, to achieve a 4,4'ODA:PPD mole ratio of 70:30, and allowed to react for approximately 30 minutes at 40-45° C. Solid PMDA was incrementally added, with agitation, and allowed to react for approximately 2 hours at 40-45° C., to achieve a polymer viscosity of 75-250 Poise. Polyamic acid solids was 19.5%-20.5%. The polymer solution was stored in a refrigerator until use.

Preparation of Multilayer Film Examples 1 Through 4:

The First polyimide layer comprised Kapton® MBC film, as indicated in Table 1.

The Second polyimide layer was prepared using the filler slurries as described above and indicated in Table 1. The slurries were thoroughly mixed with polyamic acid solution, described above and indicated in Table 1, in the appropriate ratio to produce the desired composition after curing. The resulting mixture was coated onto the First polyimide layer using a stainless steel casting rod. The coating was dried on a hot plate at 100° C. until dry by visual inspection. The resulting multilayer film was then placed on a pin frame to hold it flat, and placed in a 120 C oven. The oven temperature was ramped to 320 C over a period of 45 to 60 minutes, then transferred to a 400 C oven and held for 5 minutes, then removed from the oven and allowed to cool.

Compositions of the cured films were calculated from the composition of the components in the mixtures, excluding DMAC solvent (which is removed during curing) and accounting for removal of water during conversion of polyamic acid to polyimide.

The 60 degree gloss was measured using a Micro-TRI-gloss glossmeter (from BYK-Gardner).

The L* color was measured using a HunterLab Color-Quest® XE color meter (Hunter Associates Laboratory, Inc.) in the reflectance, specular included mode. The instrument was standardized prior to each use. Color data from the instrument were reported in the CIELAB 10°/D65 system, as L*, a*, b*. A L* value of 0 is pure black, while a L* value of 100 is pure white. Typically, a L* value difference of 1 unit is discernible to the eye.

Particle size of filler particles in the slurries was measured by laser diffraction using either a Horiba LA-930 (Horiba, Instruments, Inc., Irvine Calif.) or a Malvern Mastersizer 3000 (Malvern Instruments, Inc., Westborough, Mass.) particle size analyzer. DMAC was used as the carrier fluid.

Alcohol wipe test: The film was wiped 3 times with a towel which was wetted with isopropyl alcohol. A "Fail" grade was given if any colorant was observed to transfer from the film to the towel. This test is a measure of the suitability of the film with respect to durability to processing conditions for electronic circuit manufacture.

Results are shown in Table 1.

artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification is to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A multilayer film comprising:
   a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
   b. a second polyimide layer from 0.5 to 20 microns thick in direct contact with the first polyimide layer, the second polyimide layer comprising:

TABLE 1

| | First PI Layer | carbon black | matting agent | 2nd PI layer other filler | other filler trade name | other filler D50 (microns) | PI | Thickness (microns) First PI layer | Thickness (microns) Second PI layer | wt % carbon black | wt % matting agent | wt % PI | wt % other filler | alcohol wipe test | L* | 60° gloss | Other filler primary particle size (nm) |
|---|---|---|---|---|---|---|---|---|---|---|---|---|---|---|---|---|---|
| 1 | MBC | SB6 | PI particles | fumed alumina | Alu C805 | 0.3 | PMDA/ODA/PPD | 25 | 0.7 | 8 | 31 | 33 | 20 | pass | 22.1 | 3.4 | 13 |
| 2 | MBC | SB6 | PI particles | fumed alumina | Alu C805 | 0.3 | PMDA/ODA/PPD | 25 | 2 | 8 | 25 | 39 | 20 | pass | 25.5 | 4.0 | 13 |
| 3 | MBC | SB6 | PI particles | fumed alumina | Alu C805 | 0.3 | PMDA/ODA/PPD | 25 | 1 | 10 | 19 | 36 | 25 | pass | 23.61 | 5.6 | 13 |
| 4 | MBC | SB6 | black PI particles | fumed alumina | Alu C805 | 0.3 | PMDA/ODA/PPD | 25 | 3 | 10 | 19 | 36 | 25 | pass | 28.68 | 4.7 | 13 |

The materials, methods, and examples herein are illustrative only and, except as specifically stated, are not intended to be limiting. Although methods and materials similar or equivalent to those described herein can be used in the practice or testing of the present invention, suitable methods and materials are described herein.

Note that not all of the activities described above in the general description or the examples are required, that a portion of a specific activity may not be required, and that further activities may be performed in addition to those described. Still further, the order in which each of the activities are listed are not necessarily the order in which they are performed. After reading this specification, skilled i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;

ii) 15 to 35 wt % of polyimide particle matting agent;

iii) greater than 0 and less than 20 wt % of at least one submicron carbon black;

iv) 15 to 50 wt % of at least one submicron fumed metal oxide; and wherein the multilayer film has an L* color less than 30 and a 60 degree gloss value less than 10.

2. The multilayer film in accordance with claim 1, the first polyimide layer further comprising:
   i.) 2 to 9 wt % low conductivity carbon black;
   ii) a matting agent that:
      a. is present in an amount from 1.6 to 10 weight percent,
      b. has a median particle size from 1.3 to 10 microns, and
      c. has a density from 2 to 4.5 g/cc.

3. The multilayer film in accordance with claim 1, wherein the polyimide of the second polyimide layer is derived from pyromellitic dianhydride and 4,4'-oxydianiline or derived from pyromellitic dianhydride, 4,4'-oxydianiline and paraphenylenediamine.

4. The multilayer film in accordance with claim 1, wherein the polyimide of the second polyimide layer is derived from i) blocks of pyromellitic dianhydride and 4,4'-oxydianiline and ii) blocks of pyromellitic dianhydride and paraphenylenediamine.

5. The multilayer film in accordance with claim 1, wherein the polyimide of the first polyimide layer is derived from pyromellitic dianhydride and 4,4'-oxydianiline, and wherein the polyimide of the second polyimide layer is derived from
   i) pyromellitic dianhydride and 4,4'-oxydianiline,
   ii) pyromellitic dianhydride, 4,4'-oxydianiline and paraphenylenediamine,
   iii) blocks of pyromellitic dianhydride and 4,4'-oxydianiline and blocks of pyromellitic dianhydride and paraphenylenediamine, or
   iv) 3,3',4,4'-biphenyl tetracarboxylic dianhydride, pyromellitic dianhydride, 4,4'-oxydianiline and paraphenylenediamine.

6. The multilayer film in accordance with claim 1 wherein the submicron fumed metal oxide is fumed alumina, fumed silica or mixtures thereof.

7. The multilayer film in accordance with claim 1 wherein the polyimide particle matting agent is derived from pyromellitic dianhydride and 4,4'-oxydianiline.

8. The multilayer film in accordance with claim 1 wherein the polyimide particle matting agent of the second polyimide layer is derived from pyromellitic dianhydride and 4,4'-oxydianiline and wherein the polyimide of the second polyimide layer is derived from pyromellitic dianhydride, 4,4'-oxydianiline and paraphenylenediamine.

9. The multilayer film in accordance with claim 1, the first polyimide layer further comprising:
   i.) 1 to 15 wt % low conductivity carbon black, or
   ii.) 1 to 40 wt % pigment or dye.

10. The multilayer film in accordance with claim 9, the first polyimide layer further comprising 1 to 20 wt % of a matting agent selected from silica, alumina, zirconia, boron nitride, barium sulfate, polyimide particles, calcium phosphate, talc or mixtures thereof.

11. The multilayer film in accordance with claim 9, the first polyimide layer further comprising 1 to 20 wt % of a matting agent that is a carbon black having a mean particle size from 2 to 9 micrometers.

12. The multilayer film in accordance with claim 9, the first polyimide layer further comprising 1 to 20 wt % of a matting agent, the matting agent being a mixture of
   i) carbon black having a mean particle size from 2 to 9 microns; and
   ii) silica, alumina, zirconia, boron nitride, barium sulfate, polyimide particles, calcium phosphate, talc or mixtures thereof.

13. The multilayer film in accordance with claim 1, further comprising a third polyimide layer from 0.5 to 20 microns thick in direct contact with the first polyimide layer opposite the second polyimide layer, the third polyimide layer comprising:
   i) a polyimide derived from at least 50 mole percent of an aromatic dianhydride, based upon a total dianhydride content of the polyimide, and at least 50 mole percent of an aromatic diamine based upon a total diamine content of the polyimide; and
   ii) a matting agent or mixture thereof.

14. The multilayer film in accordance with claim 13, wherein the matting agent in the third polyimide layer is selected from silica, alumina, zirconia, boron nitride, barium sulfate, polyimide particles, calcium phosphate, talc or mixtures thereof.

15. The multilayer film in accordance with claim 13, wherein the matting agent in the third polyimide layer is a carbon black having a mean particle size from 2 to 9 microns.

16. The multilayer film in accordance with claim 13, wherein the matting agent in the third polyimide layer is a mixture of
   i) carbon black having a mean particle size from 2 to 9 microns; and
   ii) silica, alumina, zirconia, boron nitride, barium sulfate, polyimide particles, calcium phosphate, talc or mixtures thereof.

17. The multilayer film in accordance with claim 1, further comprising a third polyimide layer from 0.5 to 20 microns thick in direct contact with the first polyimide layer opposite the second polyimide layer, the third polyimide layer comprising:
   i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
   ii) 15 to 35 wt % of polyimide particle matting agent;
   iii) greater than 0 and less than 20 wt % of at least one; submicron carbon black; and
   iv) 15 to 50 wt % of at least one submicron fumed metal oxide.

18. The multilayer film in accordance with claim 17, the first polyimide layer further comprising:
   i) 1 to 15 wt % low conductivity carbon black, or
   ii) 1 to 40 wt % pigment or dye.

19. The multilayer film in accordance with claim 17, the first polyimide layer further comprising 1 to 20 wt % of a matting agent selected from silica, alumina, zirconia, boron nitride, barium sulfate, polyimide particles, calcium phosphate, talc or mixtures thereof.

20. The multilayer film in accordance with claim 17, the first polyimide layer further comprising 1 to 20 wt % of a matting agent that is a carbon black having a mean particle size from 3 to 9 micrometers.

21. The multilayer film in accordance with claim 17, the first polyimide layer further comprising a matting agent mixture of
   i) carbon black having a mean particle size from 2 to 9 microns; and
   ii) silica, alumina, zirconia, boron nitride, barium sulfate, polyimide particles, calcium phosphate, talc or mixtures thereof.

22. The multilayer film in accordance with claim 17, the first polyimide layer further comprising:
   i.) 2 to 9 wt % low conductivity carbon black;
   ii) a matting agent that:
      a. is present in an amount from 1.6 to 10 weight percent,
      b. has a median particle size from 1.3 to 10 microns, and
      c. has a density from 2 to 4.5 g/cc.

23. The multilayer film in accordance with claim 1 wherein the polyimide particle matting agent is a pigmented polyimide particle matting agent.

24. The multilayer film in accordance with claim 23 wherein the pigmented polyimide particle matting agent is derived from pyromellitic dianhydride and 4,4'-oxydianiline.

* * * * *